(12) United States Patent
Dokoupil

(10) Patent No.: US 7,025,473 B2
(45) Date of Patent: Apr. 11, 2006

(54) NIGHT LIGHT

(76) Inventor: Hans Dokoupil, Uhlandstrasse 4, D-73342 Bad Ditzenbach (DE)

( * ) Notice: Subject to any disclaimer, the term of this patent is extended or adjusted under 35 U.S.C. 154(b) by 240 days.

(21) Appl. No.: 10/000,615

(22) Filed: Nov. 1, 2001

(65) Prior Publication Data

US 2002/0075677 A1 Jun. 20, 2002

(30) Foreign Application Priority Data

Nov. 2, 2000 (DE) .......................................... 100 54 212

(51) Int. Cl.
*F21V 33/00* (2006.01)

(52) U.S. Cl. .......................... 362/226; 362/295; 362/95; 362/800

(58) Field of Classification Search ................. 362/226, 362/229, 227, 249, 95, 800, 84, 276, 802, 362/184, 253; 439/86
See application file for complete search history.

(56) References Cited

U.S. PATENT DOCUMENTS

| | | |
|---|---|---|
| 3,056,897 A | 10/1962 | Knochel et al. |
| 3,061,716 A | 10/1962 | Benander |
| 3,121,817 A | 2/1964 | Saviers |
| 3,307,030 A | 2/1967 | De Francisco |
| 4,000,405 A | 12/1976 | Horwinski |
| 4,343,032 A | 8/1982 | Schwartz |
| 4,774,641 A | 9/1988 | Rice |
| 4,812,827 A * | 3/1989 | Scripps ....................... 340/628 |
| 5,299,109 A | 3/1994 | Grondal |
| 5,384,428 A * | 1/1995 | Luu ............................ 174/66 |
| 5,465,198 A | 11/1995 | Kellogg |
| 5,481,442 A | 1/1996 | Dickie et al. |
| 5,495,402 A | 2/1996 | Houssian |
| 5,517,264 A | 5/1996 | Sutton |
| 5,544,025 A | 8/1996 | Bohlool et al. |
| 5,607,222 A | 3/1997 | Woog |
| 5,622,424 A | 4/1997 | Brady |
| 5,638,339 A | 6/1997 | DeLoretto et al. |
| 5,662,408 A | 9/1997 | Marischen |
| 5,727,953 A | 3/1998 | Pasholk |
| 5,757,111 A | 5/1998 | Sato |
| 5,779,346 A | 7/1998 | Burke |
| 5,887,802 A | 3/1999 | Yousefzadeh |
| 5,926,440 A | 7/1999 | Chien |
| 5,964,516 A | 10/1999 | Lai |
| 6,171,117 B1 * | 1/2001 | Chien .......................... 439/86 |
| 6,431,719 B1 * | 8/2002 | Lau et al. .................... 362/95 |

* cited by examiner

*Primary Examiner*—Thomas M. Sember
(74) *Attorney, Agent, or Firm*—Friedrich Kueffner

(57) ABSTRACT

A night light for mains power sockets, in particular wall sockets, includes a mains plug, a housing, a lighting element and a circuit connected between the mains plug and the lighting element. The circuit has a current limiting capacitor whereby a high-voltage capacitor with small dimensions is provided. The lighting element and/or the capacitor may be mounted on a board or printed circuit board.

14 Claims, 4 Drawing Sheets

NIGHT LIGHT

The invention is directed towards a night light for mains power sockets, in particular wall sockets, with a mains plug (1), a housing (2), a lighting element (3) and a circuit (4), which is connected between the mains plug (1) and the lighting element (3).

Night lights of this kind are known as commonly available orientation lights, for example, which in many embodiments use a glow lamp as the lighting element and an ohmic resistor as the circuit. A circuit will always be required when the lighting element cannot be connected directly to the mains voltage. Furthermore, U.S. Pat. Nos. 5,964,516, 5,779,346, 5,757,111, 5,727,953, 5,662,408, 5,622,424, 5,544,025, 5,495,402, 5,481,442, 3,121,817 and 3,056,897 are known from the patent literature. From the wealth of other solutions, mention should also be made here of U.S. Pat. Nos. 5,926,440, 5,887,802, 5,638,339, 5,607,222, 5,517,264, 5,465,198, 5,299,109, 4,774,641, 4,343,032, 4,000,405, 3,307,030 or 3,061,716.

A major problem with the known solutions lies in the fact that the usual night lights are not ideal when it comes to energy saving. Thus, a relatively large amount of energy is "burned off" via an ohmic series resistor, for example.

The task of the invention is to create a solution by means of which a night light beams out a faint light with as little energy consumption as possible and which is inexpensive and has a long life.

According to the invention, this problem is solved by the circuit having a current limiting capacitor (5) whereby a high-voltage capacitor (5) with small dimensions is provided.

By means of the invention, the energy consumption of a night light is considerably reduced using relatively simple means, whereby the circuit in particular consumes practically no energy, which is of considerable importance when several night lights are used continuously in one household, for example.

If lighting elements with low current consumption, e.g. in the region of a few milliamperes, are used, this results in a relatively low value of approx. 68 nF for the capacitor (5) enabling it to be small, e.g. 17×9×4 mm or smaller, and inexpensive. In particular, a foil capacitor or a ceramic capacitor can be used.

Due to the extremely low energy consumption of the night light according to the invention, which being in the region of 0.03 W is about 10 times less than the known night lights, the night light can be left permanently switched on whereby it is not necessary to fit a manual or time-controlled or light-controlled on-off switch to the night light.

Advantageous embodiments of the invention can be seen from the sub-claims.

Expediently, an energy-saving lighting element is used according to the $2^{nd}$ claim. For example, a low current light emitting diode (7) requires a current flow of approx. 4 mA to light up and has a lifetime of considerably more than 10,000 hours.

Advantageously, according to the $3^{rd}$ claim, the components of the night light are mounted on or soldered to a printed circuit board (8), which makes for efficient manufacture.

In a further embodiment of the invention, according to the $4^{th}$ claim, an electrical connection and simultaneously a fixing to the printed circuit board (8) is achieved by extensions (9) of contact pins (10) of the mains plug (1).

Preferably, according to the 5th claim, the lighting elements (3, 6, 7) are placed on a front side (11) of the printed circuit board (8) so that a light can be beamed out forwards into the room. In order to keep the printed circuit board (8) small, some components of the circuit, e.g. the capacitor (5), are mounted on a backside (12) of the printed circuit board (8).

Advantageously, according to the $6^{th}$ claim, the capacitor (5) is accommodated in a hollow space (13) in a body (14) of the mains plug so that this space (13) is utilized and as a result, the housing (2) of the night light can be made relatively small and flat.

Expediently, according to the $7^{th}$ claim, surface mount components or SMD components, such as SMD light emitting diodes or SMD capacitors, are used enabling manufacturing to take place efficiently using appropriate automatic populating machines.

In order to use both the positive and the negative half waves of the alternating mains voltage to produce light, according to the $8^{th}$ claim, the lighting elements, e.g. the light emitting diodes (7), are connected in anti-parallel (15). In addition, this particularly prevents a blocking current from flowing through the light emitting diodes (7).

Advantageously, according to the $9^{th}$ claim, a bridge rectifier (16) is incorporated into the circuit, by means of which all the lighting elements, in particular the light emitting diodes (7), are supplied with every half wave of the alternating mains voltage and flicker at twice the mains frequency, which creates a better visual or subjective impression.

If, as described in the $10^{th}$ claim, all the lighting elements, in particular the light emitting diodes (7), are connected in series (17), a lower current flow is produced and the capacitor (5) can be kept small and inexpensive to advantage.

In order to avoid the presence of a dangerous voltage on the contact pins (10) when the mains plug (1) is withdrawn from a mains socket, according to the $11^{th}$ claim, the capacitor (5) is discharged by means of a discharge resistor (18), whereby the value of the resistor can be several megohms, for example.

As it cannot be ruled out that the night light or the mains plug (1) is plugged in at the instant when the amplitude of the mains voltage is high, according to the $12^{th}$ claim, a possible current surge is reduced by a limiting resistor (19), whereby here the value of the resistor can be in the region of 47 ohm.

Preferably, according to the $13^{th}$ claim, an area (20) of the housing (2) of the night light is made transparent to enable the light to emerge or, alternatively, the light side of the lighting elements (3, 6, 7) is not obscured by the housing (2).

Further characteristics, details and advantages of the invention can be established from the following description and from the drawings.

FIG. 1 shows a simplified section or cutout in the night light in order to show the lighting elements (3, 6) and the capacitor (5). The housing (2) is preferably constructed so that live parts cannot be touched.

In FIG. 2, a block schematic shows the important elements of the night light such as the mains plug (1), the contact pins (10), a connection (9a) to the printed circuit board or to the circuit (4), the circuit (4) with the capacitor (5), the means of lighting (3) and the housing (2).

As can be particularly established from FIG. 3, in an embodiment shown therein, both half waves of the mains voltage are used to produce light by means of the anti-parallel connection (15) of the light emitting diodes (7).

A particularly efficient embodiment is shown in FIG. 4. Due to the bridge rectifier (16), the light emitting diodes (7)

illuminate with the positive and the negative half waves of the mains voltage.

Furthermore, the current consumption is kept low due to the series connection (17) enabling a smaller capacitor (5) to be used.

FIG. 5 shows an example of how the discharge resistor (18) can be connected so that a high voltage does not appear on the mains plug (1) if it is withdrawn at the instant when the mains voltage amplitude is high.

FIG. 6 reproduces a possible circuit for the limiting resistor (19) so that high current peaks do not occur when the mains plug (1) is inserted.

Figure 1:
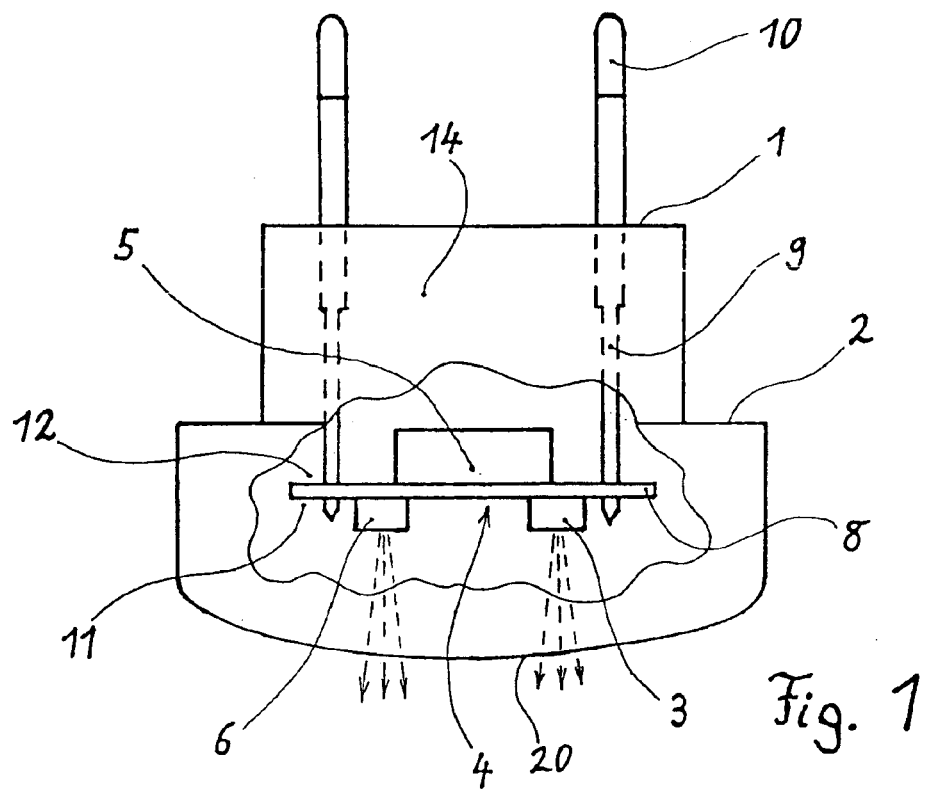
Figure 2:
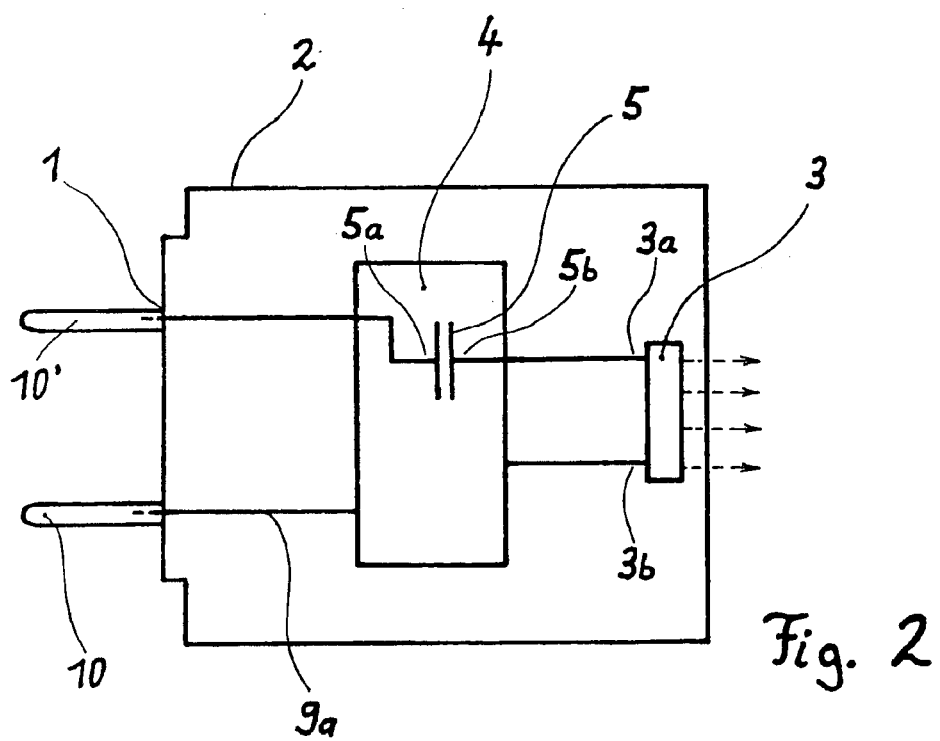
Figure 3:
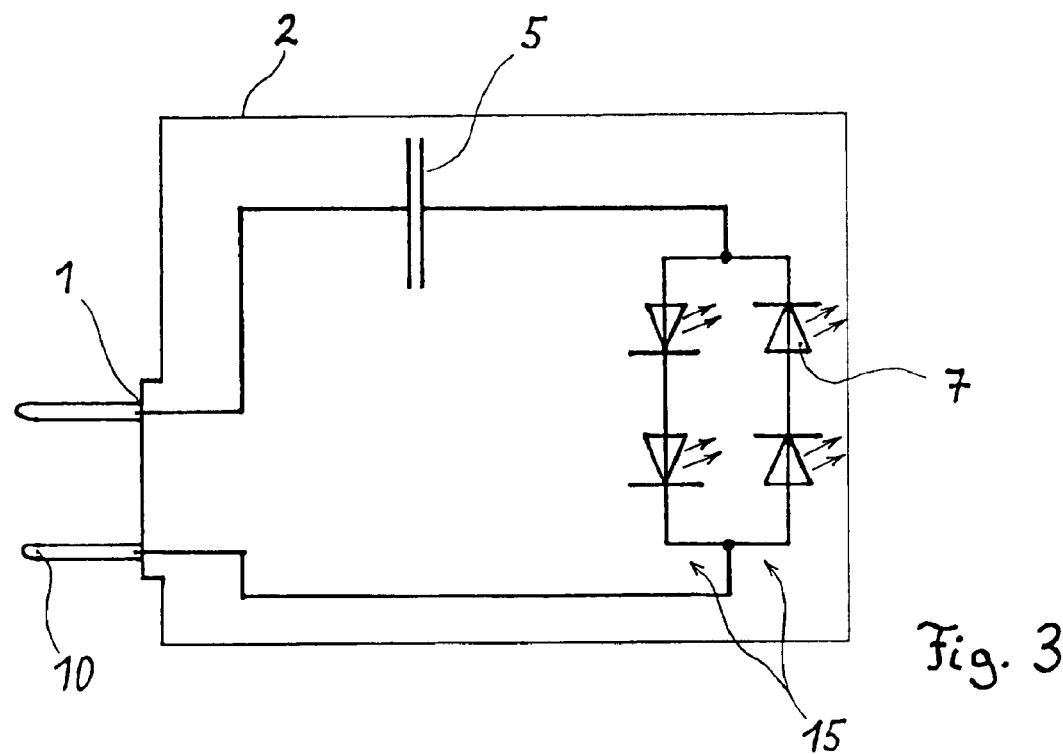
Figure 4:
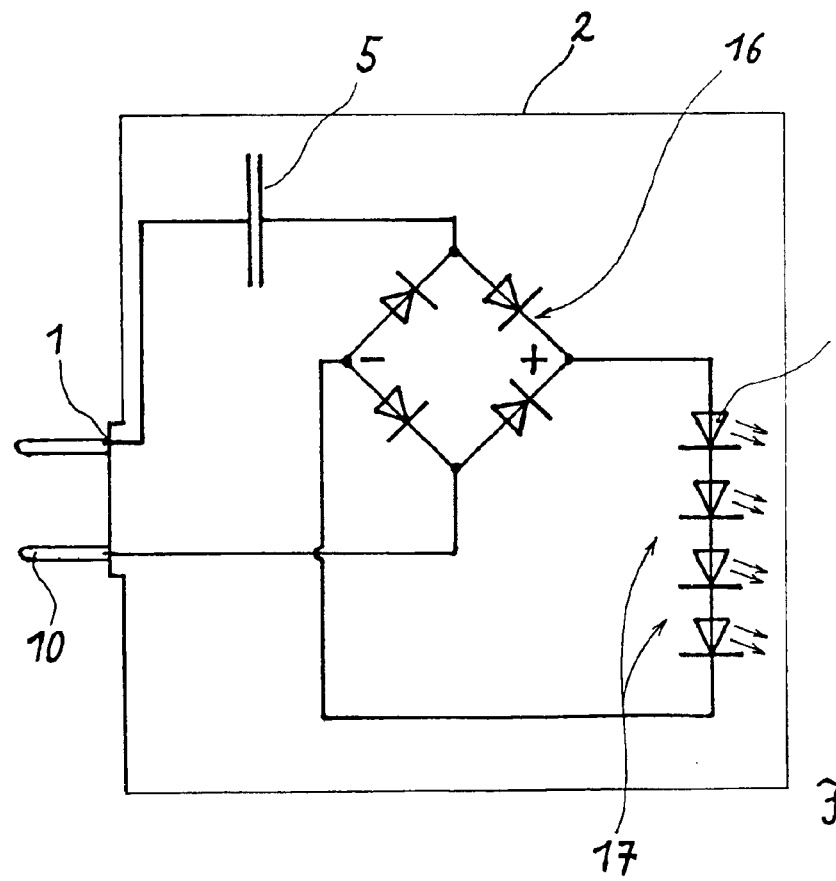
Figure 5:
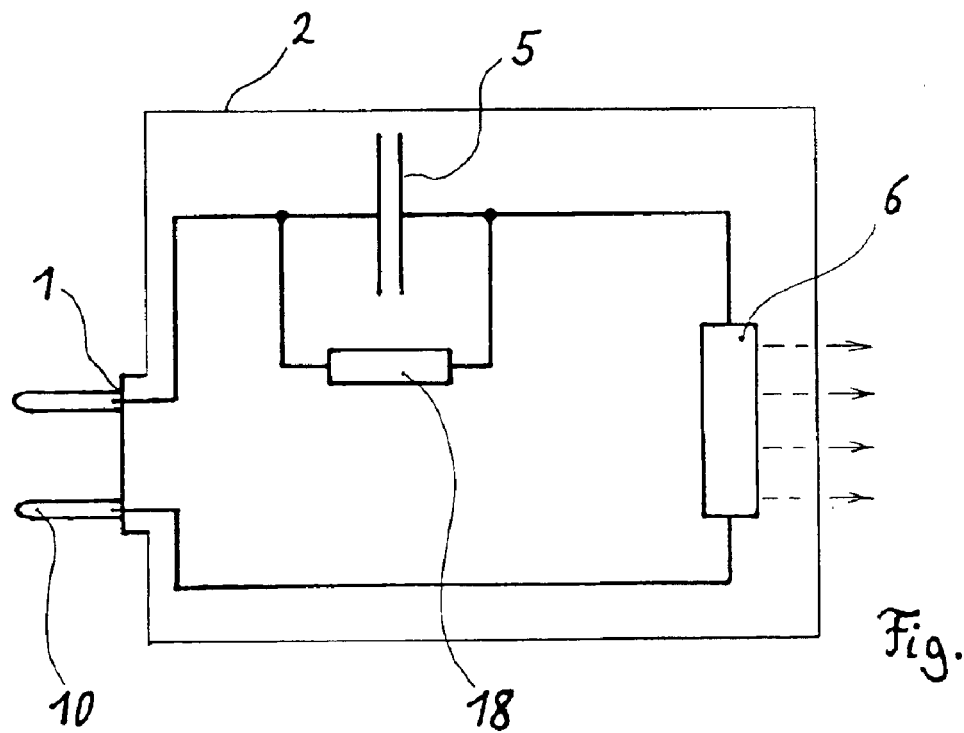
Figure 6:
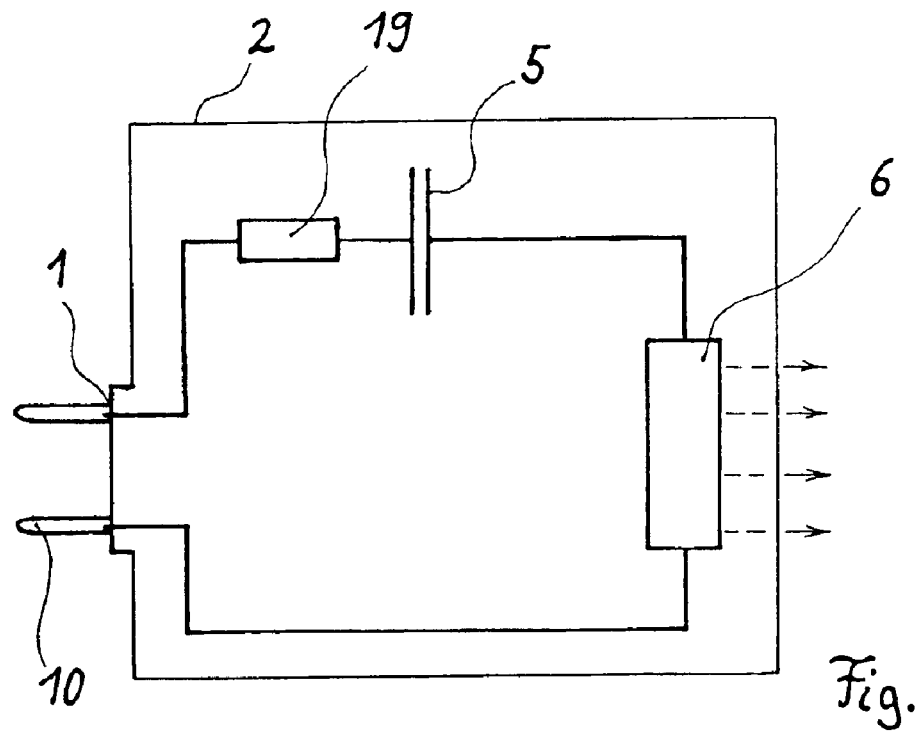
Figure 7:
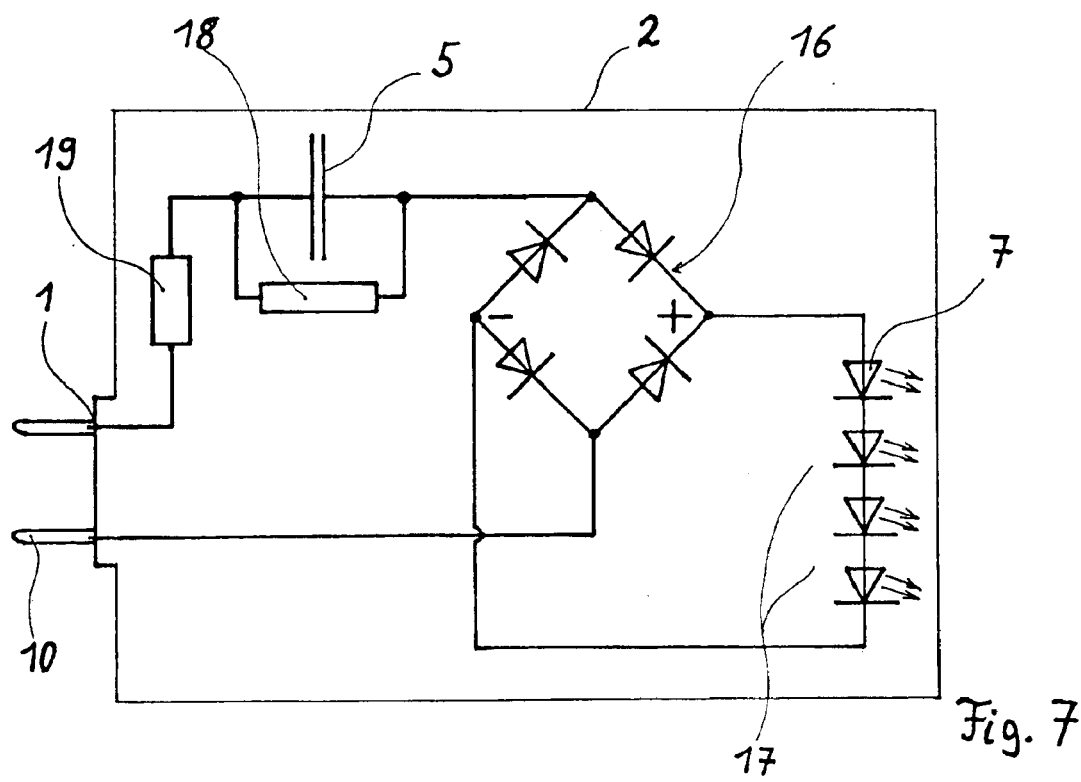
FIG. 7 shows an embodiment with the capacitor (5), the light emitting diodes (7), the bridge rectifier (16), the discharge resistor (18) and the limiting resistor (19).
Figure 8:
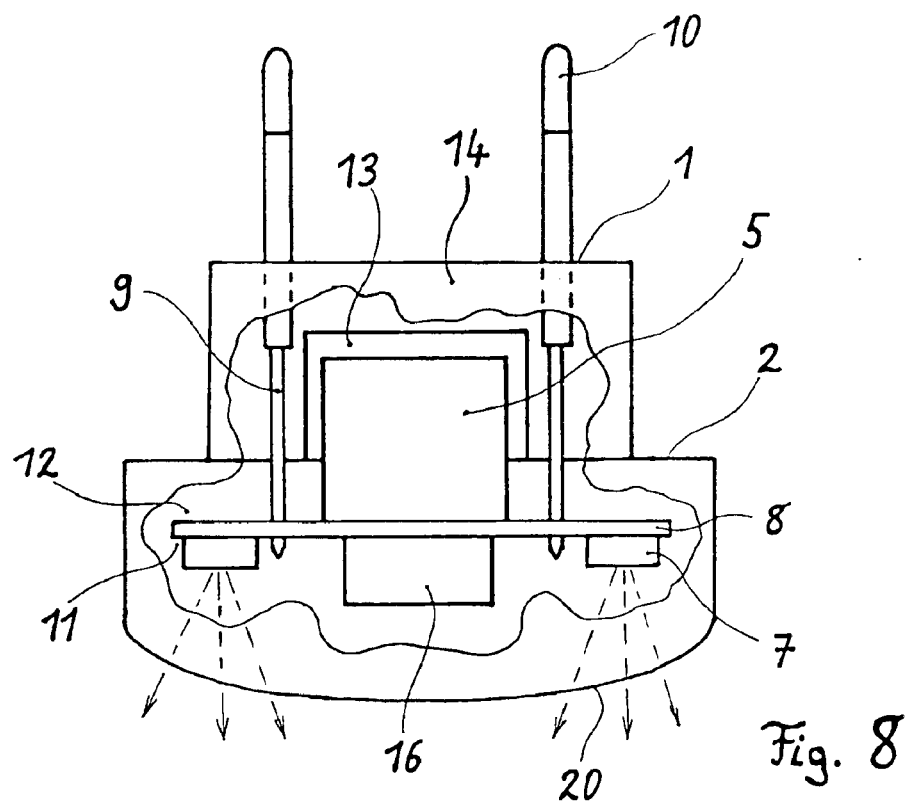
FIG. 8 shows a section or cut-out in the night light showing how the capacitor (5) is accommodated within the mains plug (1), which results in a good use of space and enables the housing (2) to be kept relatively small.

Of course, the embodiments of the invention can be changed in a number of ways without straying from the basic concepts. In particular, the invention is not restricted to the preferred form of the housing (2) shown here and also not to the simplified arrangement of the capacitor (5) in the circuit (4) or on the printed circuit board (8), which is reproduced here. It is recognized that there can be a large variety of night lights according to the invention resulting from combinations of the capacitor (5) with other components such as rectifiers or resistors.

What is claimed is:

1. A night light for mains power sockets and wall sockets comprising:
    a mains plug (1), said mains plug (1) having a first contact pin (10') and a second contact pin (10), and the mains plug (1) with the contact pins (10, 10') being constructed in such a manner that it fits into a standard mains power socket and a wall socket;
    a housing (2);
    at least one lighting unit (3, 6) for emitting a visible light permanently, said lighting unit (3, 6) having a first terminal (3a) and a second terminal (3b);
    a circuit (4), said circuit (4) being connected (9a) between the contact pins (10, 10') of the mains plug (1) and the terminals (3a, 3b) of the lighting unit (3, 6),
    and the circuit (4) including at least one high-voltage capacitor (5) with small dimensions, said capacitor (5) having a first end (5a) and a second end (5b);
    wherein the circuit (4) is constructed in such a manner that the first contact pin (10') of the mains plug (1) is connected to the first end (5a) of the capacitor (5) and the second end (5b) of the capacitor (5) is connected to the first terminal (3a) of the lighting unit (3, 6), wherein the second end (5b) of the capacitor (5) and the first terminal (3a) of the lighting unit (3, 6) have no direct connection to the mains plug (1), wherein the first contact pin (10') of the mains plug (1) and the capacitor (5) and the lighting unit (3, 6) are connected in series,
    wherein a voltage at the lighting unit (3, 6) and a current through the lighting unit (3, 6) are reduced by the capacitor (5), so that extremely little electrical energy is burned off by the circuit (4), and
    wherein the lighting unit (3, 6) and/or the capacitor (5) are mounted on a board or printed circuit board (8).

2. The night light according to claim 1, wherein the circuit (4) is constructed in such a manner that the second contact pin (10) of the mains plug (1) is connected to the second terminal (3b) of the lighting unit (3, 6).

3. The night light according to claim 1, wherein the printed circuit board (8) is retained by extensions (9) of the contact pins (10) of the mains plug (1) and these extensions (9) also form an electrical connection to the printed circuit board (8).

4. The night light according to claim 1, wherein the lighting unit (3, 6) is mounted on a front side (11) and/or the capacitor (5) is mounted on a rear side (12) of the printed circuit board (8).

5. The night light according to claim 1, wherein the capacitor (5) is situated wholly or in part in a region of the mains plug (1), in particular in a hollow space (13) within a body (14) of the plug into which the contact pins (10) pass.

6. The night light according to claim 1, wherein a discharge resistor (18) is provided for discharging the capacitor (5) when the mains plug (1) is withdrawn, the discharge resistor being connected in parallel to the capacitor (5).

7. The night light according to claim 1, wherein a limiting resistor (19) is provided to limit a current surge when the mains plug (1) is inserted, the limiting resistor (19) being connected in series with the capacitor (5).

8. The night light according to claim 1, wherein the housing (2) has a transparent area (20) from which a light from the lighting unit (3, 6) can emerge.

9. The night light according to claim 1, wherein the lighting unit (3, 6) is on the surface of the housing (2).

10. The night light according to claim 1, wherein the mains plug (1) forms and/or is the housing (2).

11. A night light for mains power sockets and wall sockets comprising:
    a mains plug (1), said mains plug (1) having a first contact pin (10') and a second contact pin (10),
    and the mains plug (1) with the contact pins (10, 10') being constructed in such a manner that it fits into a standard mains power socket and a wall socket;
    a housing (2);
    at least one lighting unit (3, 6) for emitting a visible light permanently, said lighting unit (3, 6) having a first terminal (3a) and a second terminal (3b);
    a circuit (4), said circuit (4) being connected (9a) between the contact pins (10, 10') of the mains plug (1) and the terminals (3a, 3b) of the lighting unit (3, 6),
    and the circuit (4) including at least one high-voltage capacitor (5) with small dimensions, said capacitor (5) having a first end (5a) and a second end (5b);
    wherein the circuit (4) is constructed in such a manner that the first contact pin (10') of the mains plug (1) is connected to the first end (5a) of the capacitor (5) and the second end (5b) of the capacitor (5) is connected to the first terminal (3a) of the lighting unit (3, 6), wherein the second end (5b) of the capacitor (5) and the first terminal (3a) of the lighting unit (3, 6) have no direct connection to the mains plug (1),
    wherein the first contact pin (10') of the mains plug (1) and the capacitor (5) and the lighting unit (3, 6) are connected in series,
    wherein a voltage at the lighting unit (3, 6) and a current through the lighting unit (3, 6) are reduced by the capacitor (5), so that extremely little electrical energy is burned off by the circuit (4),
    wherein the lighting unit (3, 6) is constructed in such a manner that it converts electrical energy into light energy very efficiently and generates no or extremely little heat, wherein the lighting unit (3, 6) comprises one or more lighting elements (7), and wherein said lighting element (7) is selected from the group consisting of a light emitting diode, a semi-conductor light emitting diode (7) or LED, an organic lighting element, an organic LED or OLED, a polymer lighting element, a polymer LED or PLED and a luminescent foil, and wherein at least two lighting elements (7) are connected in antiparallel (15).

12. A night light for mains power sockets and wall sockets comprising:

a mains plug (1), said mains plug (1) having a first contact pin (10') and a second contact pin (10), and the mains plug (1) with the contact pins (10, 10') being constructed in such a manner that it fits into a standard mains power socket and a wall socket;

a housing (2);

at least one lighting unit (3, 6) for emitting a visible light permanently, said lighting unit (3, 6) having a first terminal (3a) and a second terminal (3b);

a circuit (4), said circuit (4) being connected (9a) between the contact pins (10, 10') of the mains plug (1) and the terminals (3a, 3b) of the lighting unit (3, 6), and the circuit (4) including at least one high-voltage capacitor (5) with small dimensions, said capacitor (5) having a first end (5a) and a second end (5b);

wherein the circuit (4) is constructed in such a manner that the first contact pin (10') of the mains plug (1) is connected to the first end (5a) of the capacitor (5) and the second end (5b) of the capacitor (5) is connected to the first terminal (3a) of the lighting unit (3, 6), wherein the second end (5b) of the capacitor (5) and the first terminal (3a) of the lighting unit (3, 6) have no direct connection to the mains plug (1), wherein the first contact pin (10') of the mains plug (1) and the capacitor (5) and the lighting unit (3, 6) are connected in series, wherein a voltage at the lighting unit (3, 6) and a current through the lighting unit (3, 6) are reduced by the capacitor (5), so that extremely little electrical energy is burned off by the circuit (4), wherein the lighting unit (3, 6) is constructed in such a manner that it converts electrical energy into light energy very efficiently and generates no or extremely little heat, wherein the lighting unit (3, 6) comprises one or more lighting elements (7), and wherein said lighting element (7) is selected from the group consisting of a light emitting diode, a semi-conductor light emitting diode (7) or LED, an organic lighting element, an organic LED or OLED, a polymer lighting element, a polymer LED or PLED and a luminescent foil, and wherein at least two lighting elements (7) are connected in series (17).

13. A night light for mains power sockets and wall sockets comprising:

a mains plug (1), said mains plug (1) having a first contact pin (10') and a second contact pin (10), and the mains plug (1) with the contact pins (10, 10') being constructed in such a manner that it fits into a standard mains power socket and a wall socket;

a housing (2);

at least one lighting unit (3, 6) for emitting a visible light permanently, said lighting unit (3, 6) having a first terminal (3a) and a second terminal (3b);

a circuit (4), said circuit (4) being connected (9a) between the contact pins (10, 10') of the mains plug (1) and the terminals (3a, 3b) of the lighting unit (3, 6), and the circuit (4) including at least one high-voltage capacitor (5) with small dimensions, said capacitor (5) having a first end (5a) and a second end (5b);

wherein the circuit (4) is constructed in such a manner that the first contact pin (10') of the mains plug (1) is connected to the first end (5a) of the capacitor (5) and the second end (5b) of the capacitor (5) is connected to the first terminal (3a) of the lighting unit (3, 6), wherein the second end (5b) of the capacitor (5) and the first terminal (3a) of the lighting unit (3, 6) have no direct connection to the mains plug (1), wherein the first contact pin (10') of the mains plug (1) and the capacitor (5) and the lighting unit (3, 6) are connected in series, wherein a voltage at the lighting unit (3, 6) and a current through the lighting unit (3, 6) are reduced by the capacitor (5), so that extremely little electrical energy is burned off by the circuit (4), wherein the lighting unit (3, 6) is constructed in such a manner that it converts electrical energy into light energy very efficiently and generates no or extremely little heat, wherein the lighting unit (3, 6) comprises one or more lighting elements (7), and wherein said lighting element (7) is selected from the group consisting of a light emitting diode, a semi-conductor light emitting diode (7) or LED, an organic lighting element, an organic LED or OLED, a polymer lighting element, a polymer LED or PLED and a luminescent foil, and wherein the lighting element (7) and/or the capacitor (5) are designed as surface mount components or SMD components.

14. A night light for mains power sockets and wall sockets comprising:

a mains plug (1), said mains plug (1) having a first contact pin (10') and a second contact pin (10), and the mains plug (1) with the contact pins (10, 10') being constructed in such a manner that it fits into a standard mains power socket and a wall socket;

a housing (2);

at least one lighting unit (3, 6) for emitting a visible light permanently, said lighting unit (3, 6) having a first terminal (3a) and a second terminal (3b);

a circuit (4), said circuit (4) being connected (9a) between the contact pins (10, 10') of the mains plug (1) and the terminals (3a, 3b) of the lighting unit (3, 6), and the circuit (4) including at least one high-voltage capacitor (5) with small dimensions, said capacitor (5) having a first end (5a) and a second end (5b);

wherein the circuit (4) is constructed in such a manner that the first contact pin (10') of the mains plug (1) is connected to the first end (5a) of the capacitor (5) and the second end (5b) of the capacitor (5) is connected to the first terminal (3a) of the lighting unit (3, 6), wherein the second end (5b) of the capacitor (5) and the first terminal (3a) of the lighting unit (3, 6) have no direct connection to the mains plug (1), wherein the first contact pin (10') of the mains plug (1) and the capacitor (5) and the lighting unit (3, 6) are connected in series, wherein a voltage at the lighting unit (3, 6) and a current through the lighting unit (3, 6) are reduced by the capacitor (5), so that extremely little electrical energy is burned off by the circuit (4), wherein the circuit (4) includes a rectifier, and wherein said rectifier is selected from the group consisting of a bridge rectifier (16), which is made up of semi-conductor diodes, and an integrated circuit bridge rectifier.

* * * * *